United States Patent [19]

Kohler et al.

[11] Patent Number: 4,664,500

[45] Date of Patent: May 12, 1987

[54] METHOD AND APPARATUS FOR TRANSFERRING A LATENT ELECTRICAL IMAGE

[75] Inventors: Wolfgang Kohler, Kirchen; Hans-Jurgen Hommes, Betzdorf; Artur Muhl, Brachbach, all of Fed. Rep. of Germany

[73] Assignee: Meteor-Siegen Apparatebau Paul Schmeck GmbH, Fed. Rep. of Germany

[21] Appl. No.: 717,505

[22] Filed: Mar. 29, 1985

[30] Foreign Application Priority Data

Apr. 3, 1984 [DE] Fed. Rep. of Germany ....... 3412459

[51] Int. Cl.[4] ...................... G01G 15/14; G01G 15/00

[52] U.S. Cl. ................................. 355/3 TE; 355/3 R; 355/3 CH

[58] Field of Search ........... 355/3 DR, 15, 3 R, 14 R, 355/3 TE, 3 CH; 250/324

[56] References Cited

U.S. PATENT DOCUMENTS

| | | | |
|---|---|---|---|
| 2,959,153 | 11/1960 | Hider | 355/15 X |
| 2,965,756 | 12/1960 | Vyverberg | 250/324 |
| 3,438,706 | 4/1969 | Tanaka et al. | 355/15 X |
| 3,640,707 | 2/1972 | Caldwell | 118/253 X |
| 3,770,429 | 11/1973 | Kinoshita et al. | 355/15 X |
| 3,819,262 | 6/1974 | Estandarte | 355/15 |

OTHER PUBLICATIONS

Crooks, "Porous Photoconductor Coating", *IBM Technical Disclosure Bulletin*, vol. 12, No. 8, Jan. 1970.

"Electrophotographic Characteristics of Overcoated Photoreceptors" by I. Chen, in Photographic Science and Engineers, vol. 22, No. 3, pp. 168–176.

*Primary Examiner*—A. C. Prescott

*Attorney, Agent, or Firm*—Wood, Herron & Evans

[57] ABSTRACT

A method and apparatus for transferring a latent electrical image from a photosensitive image receptor to a dielectric or insulating image receptor where the photosensitive image receptor comprises a conductive base, a photoconductive layer arranged on it and on top of it a protective layer of transparent, insulating and non-photoconductive material. The protective layer surface is charged in the dark to a specific first potential; the photoconductive layer is image-exposed thereafter; the insulating image receptor is placed on the protective layer and a second, lower potential applied on the free surface of the insulating image receptor; and the insulating image receptor is separated from the protective layer of the photosensitive image receptor.

24 Claims, 4 Drawing Figures

METHOD AND APPARATUS FOR TRANSFERRING A LATENT ELECTRICAL IMAGE

BACKGROUND OF THE INVENTION

This invention relates to transferring latent electrical images. Specifically, the present invention relates to a method and apparatus for transferring latent electrical images from a photosensitive image receptor to an insulating image receptor with a conductive back.

Methods for transferring latent electrical images utilize the known principle of charge transfer (TESI process), a discussion of which is set forth in the book by R. M. Schaffert "Electrophotography", John Wiley and Sons, New York, 1975. According to this principle, a latent electrical image is produced in a photosensitive image receptor, and a charge distribution corresponding with the image is then transferred onto a dielectric image receptor. In subsequent steps, the charged dielectric image receptor, which possesses a high insulation capacity, is then toned with toner powder or in an insulating liquid containing dispersed toner, at a polarity which is opposite to the charge of the dielectric image receptor, and subsequently fixed so as to obtain an electrophotographically produced copy of a copying master.

The above method can be applied with the aid of photosensitive image receptors and a conductive base, for instance an aluminum cylinder with a layer of photoconductive semiconductor material. A disadvantage of such photosensitive image receptors is that the life of the photoconductive layer is heavily affected by the inevitable mechanical stress and, especially where the photoconductive material is selenium, by the electrical discharge phenomena occurring during the transfer.

An example of this method is disclosed in German patent disclosure No. 31 44 669. To produce a charge image on the insulating image receptor, the photosensitive image receptor is successively subject to the following process steps: (1) The protective layer is charged to a voltage value $U_1$ under complete exposure of the photoconductive layer; (2) the protective layer is discharged in the dark to a voltage value $U_2$; (3) the photoconductive layer is image-exposed; (4) the insulating image receptor is placed on the protective layer and charge carriers are passed to the free side of the insulating image receptor until in the contact zone between the insulating image receptor and the photosensitive image receptor the potential has adjusted to the potential value of the base of the photoconductive layer; and (5) the insulating image receptor is finally separated from the photosensitive image receptor by introduction of ions at the point of separation. This method is rather expensive, since it requires two preparatory corona discharge steps and, additionally, ion-containing air must be blown in for separation of the image receptors, requiring an additional ion supply.

It is also known to provide a conductive base with a photoconductive layer on which a protective layer is applied which is transparent, insulating, and itself not photoconductive, which specifically protects the photoconductive layer from mechanical damage. Such a protective layer also makes it possible to also use selenium as the photoconductive layer, since the selenium is then protected from the inevitable microdischarges which otherwise would destroy it. A method for transferring a latent electrical image onto another image receptor with the aid of a photosensitive image receptor coated with a protective layer is disclosed in "Electrophotographic Characteristics of Overcoated Photoreceptors" by I. Chen, in "Photographic Science and Engineers", Vol. 22, No. 3, pp. 168–176. There, the protective layer is first charged to a specific voltage value $U_1$, again under complete exposure. Next, through a simultaneously triggered second corona discharge, the image exposure of the image receptor is effected, whereafter the contact with the other image receptor, for instance a dielectric, insulating paper, can take place for transfer of the charge. According to an alternative embodiment of this prior method, the image exposure may take place between the first and second corona discharges. But at least two corona discharges are necessary in both cases for the application of the method.

It has been one objective of the present invention to provide an improved method for transferring a latent electrical image.

A further objective of the present invention has been to provide a maximally simple process for transferring a latent electrical image which can be realized at a high charge transfer.

A yet further objective of the present invention has been to provide a method for transferring a latent electrical image requiring only one corona discharge step.

An even further objective of the present invention has been to provide an apparatus for carrying out the improved method.

SUMMARY OF THE INVENTION

In accord with these objectives and in preferred form, the method of this invention involves the following steps: (a) charging the surface of the protective layer in the dark to a specific first potential, (b) image exposure of the photoconductive layer, (c) placing the insulating image receptor on the insulating protective layer holding the latent electrostatic image and applying a bias potential to the conductive back of the image receptor, (d) separation of the insulating image receptor from the protective layer of the photosensitive image receptor.

Further in accord with the objectives of this invention and in preferred form, an apparatus for carrying out the method of this invention includes a photosensitive image receptor fashioned specifically as a cylindrical drum which, for a transfer process, is rotatable at a specific speed. The apparatus also includes a corona discharge section parallel with the drum axis and spaced a specific distance from the drum, an exposure station for image exposure of the drum according to a copying master passing through a copying master feeder, and a transfer station for transferring the latent electrical or electrostatic image from the drum to the insulating image receptor, for instance a dielectric copying paper. The apparatus of the present invention is characterized in that the corona discharge section is darkened and that it is followed, in the direction of rotation, by the exposure station and finally by the transfer station.

One advantage of the present invention is that the separation of the insulating image receptor from the protective layer of the photosensitive image receptor requires only one corona discharge operation, which simplifies the application of the method and reduces its susceptibility to malfunction. Another quite surprising advantage of the present invention is that an especially high charge transfer is permitted in carrying out the method. As compared to an image receptor without the dielectric outer protective layer, the method of this invention wherein a dielectric protective layer is provided on the photoconductive layer improves the charge transfer quite considerably. For instance, the potential which can be transferred from the photosensitive image receptor—with a specific semiconductor layer, a specific protective layer, a definitive corona charge and a specific dielectric paper—is about 100 volts higher than with a corresponding image receptor without a protective layer, at otherwise identical conditions.

The method of this invention operates especially favorably when the protective layer is so dimensioned that the residual potential of the exposed areas drops after the image exposure of the photoconductive layer below the threshold voltage (about 350 to 500 volts) for the charge transfer from image receptor to image receptor. This ensures that the exposed areas of the latent electrical image will not transfer any charge to the insulating dielectric image receptor. These areas remain light when the latent electrical image is subsequently developed, i.e., in the toner application and subsequent fixing. The dark areas of the latent electrical image are transferred to the dielectric image receptor and accept toner which, in the subsequent development, is finally fixed.

The threshold value of the residual potential below which a charge transfer no longer takes place, according to Paschen's law, is the lower breakdown voltage where electrical breakdowns from image receptor to image receptor, and thus a charge transfer, can occur. This value is about 360 volts at normal air pressure.

The conductive base of the photosensitive image receptor is preferably grounded. The back of the dielectric or insulating image receptor is fashioned as a conductive layer which, during the contact of the insulating side with the photosensitive image receptor, that is, during the charge transfer, is connected to a specific bias potential, preferably ground potential. The bias potential is so selected that the latent electrical image on the protective layer releases from the unexposed zones charges to the dielectric image receptor which is in contact with it.

The photosensitive image receptor consists preferably of a cylindrical drum comprising a conductive drum body, a photoconductive layer of photoconductive semiconductor material upon it, and on top a protective layer of transparent, insulating and not photoconductive material. To create consistent conditions for the charge transfer, the dielectric image receptor, preferably dielectric copying paper, must approach and leave the drum along a defined path. Positional fluctuations of the paper relative to the surface of the drum or variations in the length of travel over which the dielectric image receptor is forced down on the drum produce differences in the charge transfer which express themselves in undesirable light/dark streaking after developing the dielectric image receptor.

In order to force the dielectric image receptor onto which a transfer is to take place down on the drum and simultaneously ground it on the back, it is known to employ a conductive grounded foam material roller which forces the dielectric image receptor down on the drum. With this prior hold-down element, the reproducibility of the geometric and time conditions are not dependably guaranteed during charge transfer. Specifically, expensive measures must be utilized in the stage where the dielectric image receptor is fed in order to eliminate undesirable fluctuations or streaking on the dielectric image receptor.

The present invention sidesteps these difficulties by effecting the feeding and hold-down of the dielectric image receptors by conductive perforated endless conveyor belts which can be driven in synchronism with the surface of the drum, by drive rollers, and which are tensioned by means of at least one tensioning roll, which in the transfer station feed the dielectric image receptors tangentially to the photosensitive drum, hold them down, and separate them again while at the same time holding the conductive back of the dielectric image receptor at the desired bias potential.

To facilitate the precise feeding into the transfer position and to facilitate the separation of the image receptor from the drum, the conveyor belts are preferably provided with perforations. Located on the far side from the drum, underneath the conveyor belts, is a suction box and a suction blower causing the dielectric image receptors to be sucked onto the conveyor belts before entering the transfer position, i.e., long before making contact with the photosensitive drum, and to be carried along in a precise relative position. Thus, the dielectric image receptor retains its defined position on the conveyor belts before, during and after charge transfer, preventing the dielectric image receptor from sticking to the drum through electrostatic or mechanical forces. This ensures both a defined feeding and delivery of the dielectric paper.

To avoid the necessity of overly tensioning the conveyor belts but nevertheless ensuring a uniform hold-down of the dielectric image receptor on the drum, the belts can additionally be forced evenly on the drum, from below, by a soft rubber or foam material roll.

The perforations in the conveyor belt preferably have a diameter of less than 2 mm and are spaced sufficiently close to hold the dielectric image receptor flatly thereon across its entire surface. This ensures a uniformly good transfer across the entire surface of the dielectric image receptor.

This arrangement, specifically the suction forces acting on the dielectric image receptor, ensures that the dielectric image receptors will not stick to the drum. Avoided thereby are the customary mechanical strippers, which in time will damage the drum through mechanical chafing.

The apparatus of the present invention can be adapted both for transmission radiation and incident radiation. While prior apparatuses generally operate only with incident radiation such as required for copying written material, transmission radiation is especially advantageous specifically when copying original drawings of any type, which are produced on transparent paper. One advantage of operating with transmission radiation is the considerably lower brightness of exposure and the lower light energy associated with it.

In operation, the copying master is passed across the exposure gap in synchronism with the movement of the drum surface. Feed and hold-down rollers pass the dielectric image receptor around a rotating glass cylinder and force it onto the glass cylinder when passing through the exposure gap. For transmission exposure, a tubular light source extending parallel with the exposure gap is provided in the glass cylinder. Additional tubular lamps with reflectors for incident light operation are situated between the exposure gap and the drum in the exposure station.

BRIEF DESCRIPTION OF THE DRAWINGS

The objectives and advantages of this invention will be more apparent from the following detailed description taken in conjunction with the drawings in which.

DETAILED DESCRIPTION OF THE DRAWINGS

Figure 1:
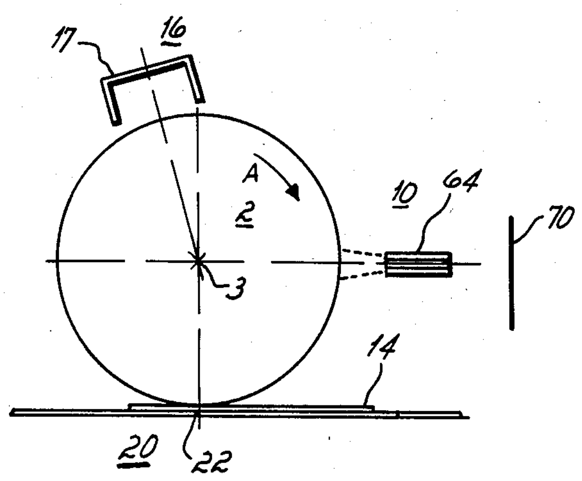
FIG. 1 is a side view of part of the apparatus illustrating the method in accordance with the principles of this invention.
Figure 2:
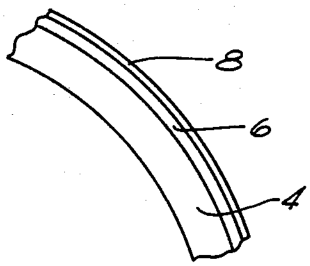
FIG. 2 is the layer structure of the photosensitive image receptor.

FIGS. 1 and 2 show a schematic illustration of a device suited for explaining the process sequence. A photosensitive image receptor 2 having the form of a cylindrical drum mounted so as to be rotatable about its drum axis 3 consists of a metallic drum body 4, the latter comprising a conductive base. Surrounding drum body 4 is a photoconductive layer 6, and on top of the photoconductive layer 6 there is provided a protective layer 8 of transparent, insulating and itself not photoconductive material.

In a first step, photosensitive image receptor 2 is charged by a corona discharge section 16, in the dark, to a specific first potential. Next, a copying master 70, for instance a document or drawing, is exposed and, in a second process step, projected by means of a lens 64 onto the photosensitive image receptor, i.e., photoconductive drum 2. As a result of the exposure step, a potential distribution which corresponds with the bright-/dark values of the copying master is achieved in the photoconductive image receptor 2.

In a third process step, the dielectric surface of a flat dielectric image receptor 14, preferably dielectric copying paper with a conductive back, is brought in contact with the image-exposed photosensitive image receptor 2. An electrically conductive hold-down element, for instance a conductive conveyor belt 22, forces the conductive back of the dielectric image receptor 14 in non-slip fashion against the surface 8 of rotating drum 2, while maintaining it at a specific bias potential, preferably ground potential. As will be explained in greater detail below, a relatively low potential is present in the exposed zones of photosensitive image receptor 2, at the surface, whereas a relatively high potential is present at the surface of the unexposed zones. As a result, the unexposed zones pass a relatively high charge to dielectric image receptor 14 as the photosensitive and the dielectric image receptors are brought in contact, whereas the exposed zones pass only a low and/or no charge at all to dielectric image receptor 14.

Next, in another process step, dielectric image receptor 14 is separated from the photosensitive image receptor 2 and then, normally, passed to a developing station (not shown) where the latent electrical image on dielectric image receptor 14 is toned. Zones of high charge density accept much toner while the zones of low charge density accept only little or none at all. Next, the copy so made is fixed in a fixing station (not shown) and finally delivered.

Figure 3:
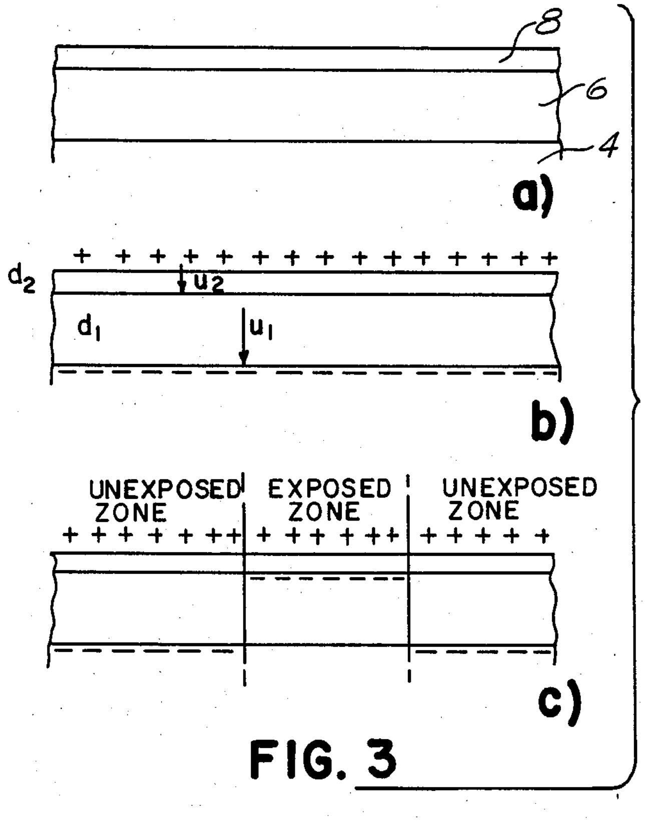
FIGS. 3*a*, 3*b*, and 3*c* illustrate the photosensitive image receptor during several successive steps.

FIG. 3 presents a section through the photosensitive image receptor 2 after various process steps. FIG. 3*a* shows the layer sequence of the photosensitive image receptor 2 in discharged condition. Situated on the conductive base 4 is the photoconductive layer 6, and on top of it the protective layer 8 from clear, insulating and non-photoconductive material.

FIG. 3*b* shows the photosensitive image receptor 2 after large-area charging through the corona discharge section 16. This charging takes place in the dark whereby the photoconductive layer 6, which preferably contains selenium, acts as an insulator. The surface of the protective layer 8 is positively charged through the corona discharged, causing the same amount of negative charge carriers to build up in the conductive base 4. If the base 4 is grounded, as is preferable, the surface of the protective layer 8 carriers a specified predetermined positive potential.

FIG. 3*c* shows the photosensitive picture receptor 2 after image exposure, with an exposed zone being illustrated between two unexposed zones. While the condition shown in FIG. 3*b* continues unchanged in the unexposed zones, the photoconductive layer 6 in the center, exposed zone has assumed a low impedance state during exposure, so that the corresponding negative charge has migrated from the conductive base 4 to the lower interface of the protective layer 8 and photoconductive layer 6. Since during and after exposure, the charge at the surface of the protective layer can not dissipate but is retained, the respective negative charge will also not change during exposure. The charge remains essentially constant. Hence, the capacitance per unit length increases in the exposed zones, since positive and negative charge are directly opposite at the two interfaces of the protective layer 8. Due to the relation $$Q=C\times U$$

between the charge Q, capacity C and voltage U, it follows that, at a constant charge and increasing capacitance per unit length, the voltage and/or potential at the surface of the exposed zone, unlike in the unexposed zone, decreases correspondingly.

The protective layer 8 is now so dimensioned that the potential on its surface in the unexposed zones, the so-called residual potential, will remain below a threshold value which ensures that a charge transfer can no longer take place, in the exposed zones, to the applied dielectric image receptor which is grounded on its outside. According to Paschen's law, this threshold value of the residual potential is approximately 360 volts at normal air pressure.

To prevent a charge transfer in the exposed zones, the residual potential at the surface of the protective layer must thus be lower than 360 volts in the exposed zones.

To calculate the dimension of the protective layer, these assumptions are made:

(a) photoconductive layer 6 has a 60μ selenium/telluride coating and a dielectric constant of $\epsilon=7$;

(b) the applied protective layer 8 has a dielectric constant of $\epsilon=3$. When considering the system of photosensitive image receptor 2 as a layered capacitor, the field strengths in the photoconductive layer ($d_1$) and the protective layer ($d_2$) are:

$$E_1 = \frac{U}{d_1 + \frac{\epsilon_1}{\epsilon_2} d_2}$$

and

-continued $$E_2 = \frac{U}{d_2 + \frac{\epsilon_2}{\epsilon_1} d_1}$$

wherein:

$U_1 = E_1 \times d_1$ $U_2 = E_2 \times d_2$

From the foregoing, if a primary charge U=1400 volts is now assumed through the corona discharge section 16 and a maximum residual potential of 150 V permitted, the thickness of protective layer 8 should be $d_2 = 8.5\mu$. That is, the thickness of the protective layer desired to prevent the in order for the exposed zones from transferring a charge to dielectric image receptor 14, so that the charge transfer can take place only in the unexposed zones.

In an example conducted using a selenium/telluride layer and no protective layer with a very specific dielectric paper and a specific primary charge, a potential of 80 volts to 100 volts was transferred from the unexposed zones of the photosensitive image receptor to the dielectric copying paper. Under identical conditions, but with an additional protective layer 8 dimensioned according to the above calculation, surprisingly, the method of the present invention showed a potential transfer of about 160 volts to about 180 volts in the unexposed zones.

Figure 4:
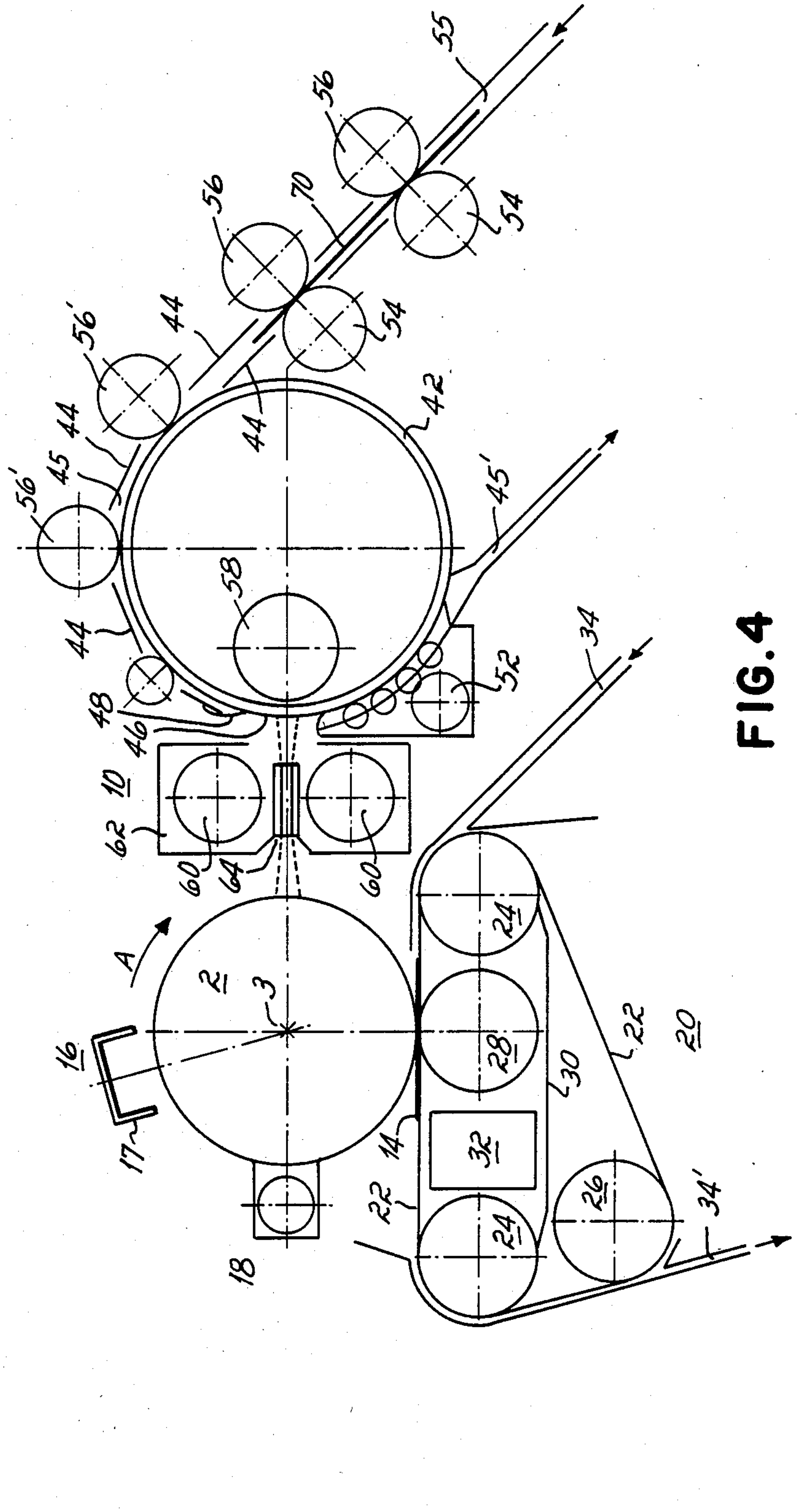
FIG. 4 is a more detailed side view of the apparatus illustrating the method of the present invention.

FIG. 4 is a more detailed schematic illustration of a device for generating and transferring a latent electrical image. The photosensitive image receptor 2 is fashioned as a cylindrical drum which is designed as shown in FIGS. 1 through 3 and includes on the drum-shaped conductive base 4 a photoconductive layer 6 and a protective layer 8 thereupon. Arranged in the direction of drum rotation as indicated by arrow A in FIG. 4 is the corona discharge section 16, parallel with the drum axis 3, and including a light cover 17. Thereafter is an exposure station 10 where the drum 2 is image-exposed according to a copying master passed through by a feeder 40. Following in the direction of rotation of arrow A is the the transfer station 20 where the dielectric image receptor, preferably dielectric copying paper 14, is brought in nonslip contact with the surface of the drum 2 so as to transfer the latent electric image produced by the image exposure to the dielectric image receptor. Normally, the transfer station is followed by a developing station (not shown) for toning the charged dielectric image receptor 14, and thereafter by a fixing station (also not shown) to fix the toned dielectric image receptor. Located behind the transfer station 20, in the direction of rotation of the drum 2, is an overall exposure station 18 producing over the entire surface of the dielectric protective layer 8 the residual potential which existed previously in the exposed zones. The drum is then ready for another transfer process in which the repeated corona charge is so dimensioned that together with the residual potential the desired primary charge is effected again on the drum. If desired, the drum can be completely discharged through another corona discharge, prior to the next transfer process, during or after overall exposure, so that any residual voltage is eliminated on the dielectric protective layer.

The transfer station 20 comprises conveyor belts 22 fashioned as continuous belts arranged on drive rollers 24 and at least one tensioning roller 26. Belts 22 are driven to cause a portion to make essentially tangential and nonslip contact with the surface of the drum 2. The conveyor belts 22 consist of an electrically conductive material having a plurality of perforations. As stated earlier, the perforations are each preferably less than 2 mm in diameter and the hold density is such that the perforations are spaced sufficiently close so as to hold receptor 14 uniformly flat across belts 22. Located on the side away from the drum 2, below the conveyor belts 22, is a suction box 30 connected with a suction blower 32 for sucking air through the perforations in the conveyor belts.

The dielectric image receptor 14 passes through a feed channel 34 onto the conveyor belts 22 onto which it is sucked under the effect of the suction blower 32 and brought in nonslip contact with the drum 2 by the conveyor belts 22. For stabilization and, as the case may be, raising the hold-down pressure in the contact area, there is provided a hold-down roll 28. Hold-down roll 28 is made of elastic material to assist in urging conveyor belts 22 towards drum 2. As seen in FIG. 4, dielectric image receptor 14 passes out of transfer station 20 through feed channel 34'.

The copying master feeder 40 comprises a rotating glass cylinder 42 the axis of which is parallel to the axis 3 of the photosensitive drum 2 as shown in FIG. 4. Arranged around the glass cylinder 42 is a guide element 44 which, in the radiation path of the lens 64 of an exposure station 10, has an axially parallel opening serving as exposure gap 46. The copying master 70 is fed into the channel 45 between guide element 44 and glass cylinder 42, through a feed section 55 formed by feed rollers 54 and hold-down rollers 56. Master 70 moves without slip along with glass cylinder 42, due to hold-down rollers 56' distributed around the glass cylinder. The movement of the surface of the glass cylinder 42 is synchronous with the movement of the surface of the drum 2. For forcing the copying master 70 onto the glass cylinder 42, the guide element 44 comprises toward the exposure gap 46 hold-down lamellae 48 which are directed at the glass cylinder 42. After passing through exposure gap 46, in the direction of rotation, copying master 70 enters the continuation 45' of channel 45. To facilitate entering continuation channel 45', a blower 52 can be provided in the entrance section.

Located between the copying master feeder 40 and the photosensitive drum 2 is the exposure station 10 which in addition to the lens 64 also includes light sources 60 and associated reflectors 62 for selective incident irradiation of the copying master. The lens 64 of the exposure station 10 projects the image from exposed copying master 70 onto photosensitive drum 2 and effects the image exposure of the drum.

Having described the invention, what is claimed is:

1. A method for transferring a latent electrical image from a photosensitive image receptor to an insulating image receptor with a conductive back, the photosensitive image receptor comprising a conductive base, a photoconductive layer upon said base, and on top of said photoconductive layer a protective layer of clear, insulating and itself non-photoconductive material, the method comprising, in sequence, the steps of:

(a) charging the surface of the protective layer in the dark to a specific first potential, (b) image exposure of the photoconductive layer, (c) placement of the insulating image receptor on the insulating protective layer holding the latent electrostatic image, and application of a bias potential on the conductive back of the image receptor, (d) separation of the insulating image receptor from the protective layer of the photosensitive image receptor, said image exposure step (b) and said placement setp (c) occurring without further charging of the surface of the protective layer coincident with said image and placement steps and between said image and placement steps.

2. The method of claim 1 further comprising the step of (e) an overall exposure of the photoconductive layer after separation of the insulating image receptor.

3. The method of claim 1 wherein the thickness of the protective layer is sufficiently small whereby the residual potential of its free surface lies below a specific threshold value after image exposure.

4. The method of claim 3 wherein the threshold value of the residual potential of the protective layer is below 360 volts.

5. The method of claim 1 wherein the base of the photosensitive image receptor is grounded.

6. The method of claim 5 wherein the conductive back of the insulating image receptor is grounded during the transfer process.

7. The method of claim 1 wherein the insulating image receptor is removed from the photoconductive image receptor by suction.

8. Apparatus for transferring a latent electric image from a photosensitive image receptor drum which at a transfer process can be rotated about its axis at a given speed to a dielectric copying paper, the drum having a conductive base, and at least one layer surrounding said base, the apparatus comprising:

darkened corona discharge means situated parallel with the axis of said drum and spaced from said drum a predetermined distance for charging said drum in the dark;

feeder means for supplying an original to be exposed on said drum;

exposure station means for image exposure of said drum according to said original without further charging said drum, whereby a latent electric image is created on said drum;

transfer station means for transferring said latent electric image from said drum to the copying paper after said image exposure of said drum and before further charging said drum.

9. The apparatus of claim 8 wherein said corona discharge means comprises a light cover, and said exposure station and said transfer station are arranged one after the other and after said corona discharge means in a path defined by the direction of rotation of said drum.

10. The apparatus of claim 9 further including an overall exposure station positioned along said path after said transfer station and before said corona discharge means.

11. The apparatus of claim 9, said transfer station comprising conveyor belts which are in nonslip running contact with said drum outer layer and establish contact of said copying paper with said exposed drum.

12. The apparatus of claim 11, said conveyor belts being of electrically conductive material.

13. The apparatus of claim 12 wherein said drum base and said conveyor belts are coupled to the same electrical potential.

14. The apparatus of claim 11, said conveyor belts being in essentially tangential contact with said drum outer layer.

15. The apparatus of claim 11, said conveyor belts defining a continuous belt which can be driven in synchronism with said drum, said apparatus including drive roll means for driving said continuous belt, said drive roll means including tensioning means for tensioning said continuous belt.

16. The apparatus of claim 11 further including compression roll means for urging said conveyor belts against said drum outer layer.

17. The apparatus of claim 16, said compression roll means being of foam material.

18. The apparatus of claim 9, said conveyor belts containing a plurality of perforations, the apparatus further comprising suction means positioned on the far side from said drum for sucking the dielectric copying sheet onto said conveyor belts.

19. The apparatus of claim 8, said feeder means comprising at a specific distance from said drum an exposure gap extending parallel with said drum axis across which passes said original in synchronism with the movement of the surface of said drum during its exposure for generation of a latent electric image on said drum.

20. The apparatus of claim 19 further including an exposure station between said feeder means and said drum, said exposure station containing a source of light and a reflector for emitting an optical ray and for selective incident irradiation of the master, said feeder means further comprising a rotating glass cylinder having an axis which is parallel with said drum axis, and a guide element defining a channel around said glass cylinder, said guide element including an axially parallel opening which in the path of said optical ray of said exposure station forms said exposure gap.

21. The apparatus of claim 20, said feeder means including a feed station comprising feed rolls and compression rolls for feeding the master into said channel.

22. The apparatus of claim 20 further including light source means inside said glass cylinder for transmission irradiation of said master.

23. The apparatus of claim 20, said guide element comprising hold-down lamellae being inclined toward said exposure gap.

24. The apparatus of claim 21 further including hold-down rolls about said glass cylinder, said hold-down rolls protruding into said channel and bearing on said glass cylinder.

* * * * *